Figure 1:
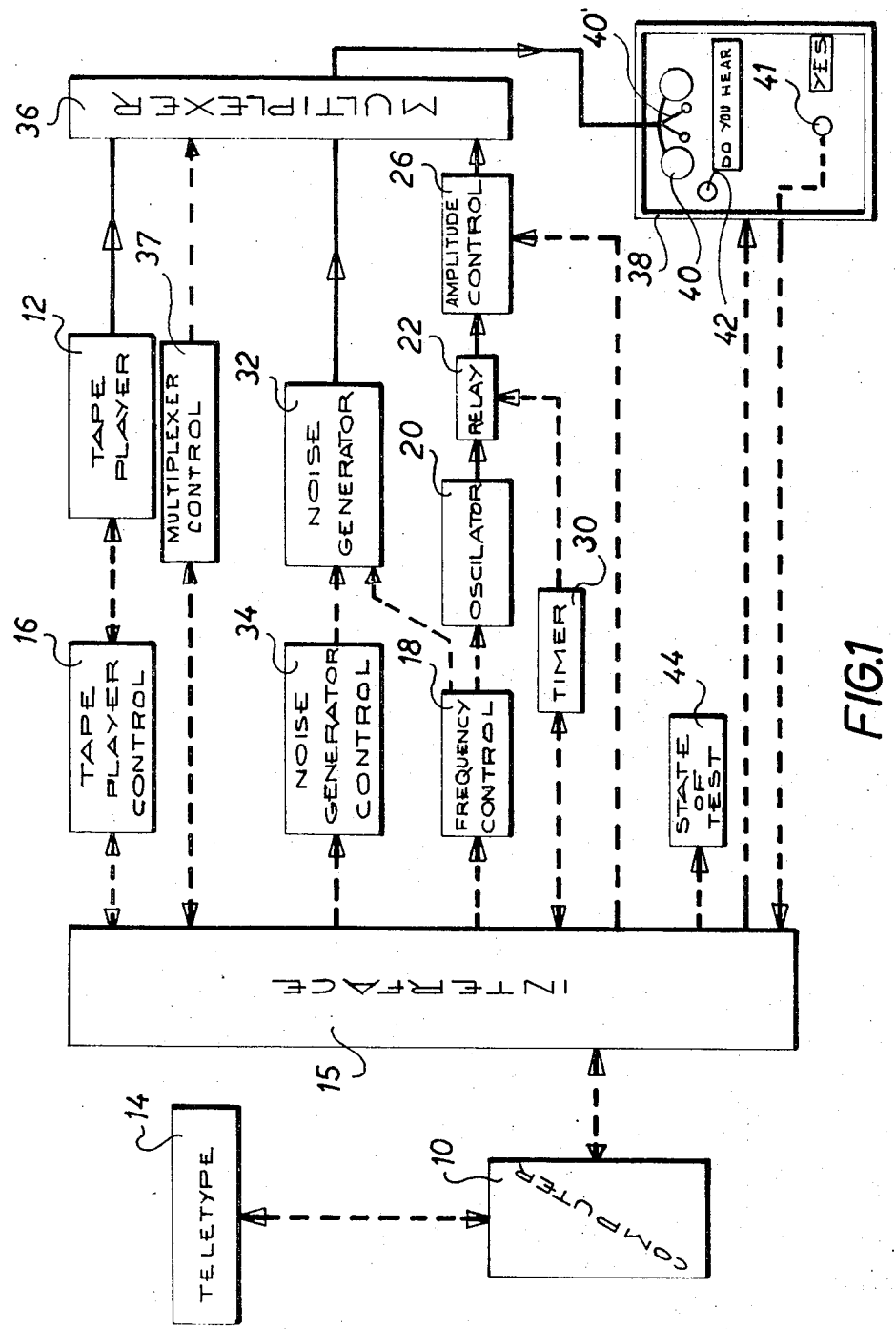

United States Patent [19]
Delisle et al.

[11] 3,809,811
[45] May 7, 1974

[54] SYSTEM FOR CONDUCTING AUTOMATICALLY AN AUDIOMETRIC TEST

[75] Inventors: Jules Delisle; Victor Baillargeon, both of Sherbrooke, Quebec, Canada

[73] Assignee: Universite De Sherbrooke, Sherbrooke, Quebec, Canada

[22] Filed: Aug. 10, 1972

[21] Appl. No.: 279,359

[52] U.S. Cl. ................................................ 179/1 N
[51] Int. Cl. ............................................ H04r 29/00
[58] Field of Search ................... 179/1 N; 181/.5 G

[56] References Cited
UNITED STATES PATENTS
3,536,835  10/1970  Rawls ............................... 179/1 N
3,237,711  3/1966  Bates ................................ 179/1 N
3,392,241  7/1968  Weiss ............................... 179/1 N Primary Examiner—Kathleen H. Claffy
Assistant Examiner—Jon Bradford Leaheey
Attorney, Agent, or Firm—Cushman, Darby & Cushman

[57] ABSTRACT

The disclosure herein describes a system for conducting automatically an audiometric test using a data processing means, in which are stored a series of tone frequencies, amplitude levels and time periods, and including a circuitry enabling the application of stimuli to a subject. Depending on each response received from the subject in answer to a given tone frequency, the apparatus will (1) continue the test utilizing a different amplitude level for the same tone frequency, (2) register the minimum threshold of the tone frequency, (3) continue the test utilizing a different tone frequency, or (4) register an aberration. The apparatus also enables the application of a vocal test to a subject in which the subject must indicate which word in a series of displayed words was heard.

11 Claims, 2 Drawing Figures

SYSTEM FOR CONDUCTING AUTOMATICALLY AN AUDIOMETRIC TEST

This invention relates to an apparatus for automatically conducting a basic audiometric test on a subject with a view to generate an accurate record of the status of the auditory sense organs of the subject.

Broadly, the hearing acuity of a subject is deducted from his responses to a series of sounds of different frequencies. For a long period of time, this audiometric procedure was carried out manually; it required a trained audiologist to determine and apply different frequencies at various intensity levels. Such conventional method of establishing an audiogram requires a certain skill and training on the part of the audiologist or the audiometer operator. More recently, certain apparatus have been devised which automatically conduct an audiometric testing procedure and which include means for applying a series of stimuli to a subject and pattern detector means for automatically evaluating the responses of the subject to such stimuli and for determining when an acceptable pattern of responses has occurred. An example of such an audiometric apparatus is disclosed in U.S. Pat. No. 3,392,241 issued to E. M. Weiss et al. on July 9, 1968. Such audiometric procedure lacks in flexibility. The audiometer used is limited to few general patterns of responses to determine the threshold of hearing and its pattern recognition circuit is capable only of recognizing the occurrence of an acceptable response pattern after a given number of score periods. If no pattern is detected after these score periods, the threshold determination procedure is guessed; the audiogram will then show that, for a particular frequency, the threshold is only guessed. It can therefore be seen that, although there is in reality a threshold for any particular frequency, it cannot be determined and registered. It frequently occurs, in an audiometric test, that, for a given frequency, it is extremely difficult to arrive at a recognizable pattern; this is due in some cases to nervousness or fatigue on the part of the subject during the test. Also, it has been observed that some subjects attempt to influence a test record. There is therefore a need of a means for obtaining an accurate and complete record of the state of the auditory sense organs of subjects. For a given frequency when the response of the subject is so erratic that a threshold cannot be determined, an apparatus is required which makes it possible to leave aside that particular test frequency and to continue with the test with another frequency while still being able to return to the frequency for which no acceptable response could previously be obtained.

It is an object of this invention to provide a novel audiometric testing apparatus which provides an accurate and complete record of the threshold hearing of a subject.

It is a further object of this invention to provide a computing automatic audiometer which no longer requires the presence of a trained audiologist and which is characterised by having its entire operation managed by a computer program, the successive execution of the test being carried out without any intervention by the operator.

It is still an object of this invention to provide an improved computing audiometric testing apparatus which has enough flexibility so that inevitable variations in the audiometric test will only affect the software part of the apparatus rather than resulting in the construction of a completely new circuitry such as is the case in the above Weiss et al. patent.

It is a further object of this invention to provide an automatic audiometer wherein a vocal test may be performed in addition to the tone test.

Figure 2:
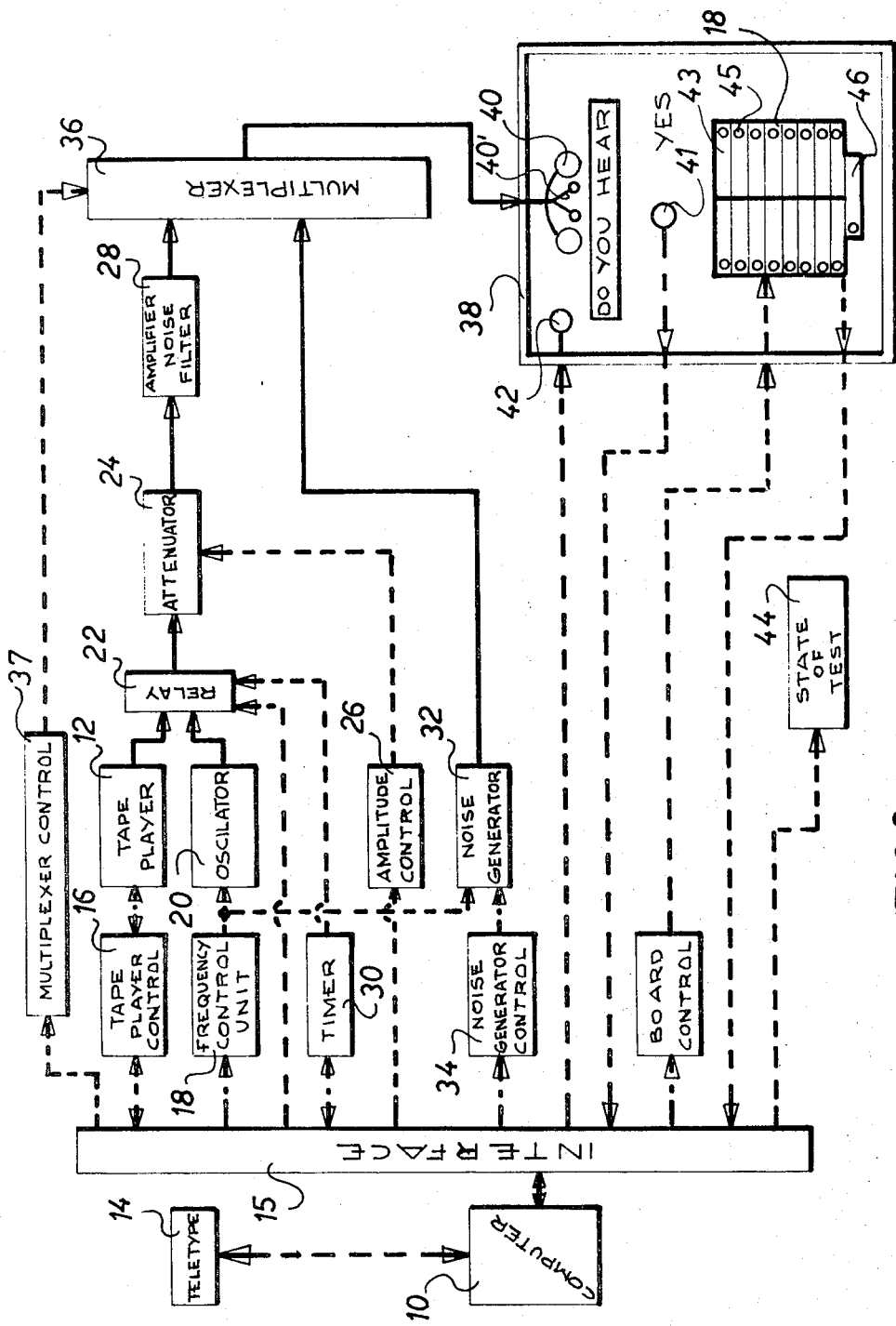

These and other more detailed and specific objects will be disclosed in the course of the following specification, reference being had to the accompanying drawings, in which:

FIG. 1 is a block diagram illustrating the overall circuit arrangement of one illustrative embodiment of an automatic computing audiometer incorporating the principles of the invention; and FIG. 2 is a block diagram illustrating the circuit arrangement of another illustrative embodiment of an audiometer incorporating the principles of the invention.

Referring generally to FIGS. 1 and 2, there are shown two block diagrams in which like reference numerals refer to like or corresponding elements. Appropriate lines are shown interconnecting various blocks to indicate generally the conductors through which various signals may flow, an audio signal being represented by a full line while a command signal being represented by a broken line.

An audiogram is the graphic representation of the relation of the auditory minimum threshold versus vibrational frequency and serves in the measurement of the acuity of hearing of a person. The operational outline of a standard test permitting to establish such audiogram is very simple: for different frequencies, the test subject is given sounds of various amplitudes until the minimum threshold of hearing is reached. For each intensity heard, the test subject indicates that he has heard the transmitted sound.

The system proposed by the present application enables the execution of such basic audiometric test according to the standards used in the most usual clinical tests. Once the test is started, no human intervention is required; in order to insure the functioning of this system, it is not necessary to have an audiologist, but only an operator having a basic training may suffice. The test is carried out under the control of a computer 10 which may be a small computer, such as a PDP-8 or other so-called mini-computers, especially programmed to carry out the test. However, the audiometric circuitry can also be branched to a console on a central computer which operates in time sharing; it is only necessary to change the interface modules in order to render this system adaptable to a central computer. The flexibility of either type of computers easily facilitates a simple change of program and lends itself very easily to the experimentation in clinical audiometry.

It will be expected from the man skilled in the art to know that the computer 10 is a data processing means which includes a memory for storing at respective addresses data and instructions for processing these data, means for controlling the sequential execution of successively addressed instructions, means for transferring to an instruction stored at a particular address as the result of executing these instructions, and means for comparing data. Therefore, the data processor 10 used with the present invention will include a series of data related to parameters such as tone frequencies, amplitude levels, time periods, etc, and instructions concerning the operation of the basic audiometric test whereby the computer will be able to execute the series of instructions stored in successive addresses in the memory unit and to compare the responses received from the test subject and from other components of the audiometric circuitry, as hereinbelow described, to then represent with the teletype the audiogram of the test subject. It is therefore wished to have it understood that the present application is not concerned with a novel program for conducting an audiometric test but rather the system, including the computer, which enables the execution of such audiometric test.

Referring to FIGS. 1 and 2, there is shown a tape player 12 adapted to provide instructions to the test subject and also to ascertain that the subject is capable of undergoing the test. A tape player control unit 16 is connected between the module interface 15 and the tape player 12; the function of this control unit 16 consists, on the one hand, to transmit the command of the tape unreeling, either at the beginning of a pre-test or during a vocal test, as hereinbelow described. On the other hand, the control unit 16 receives from the tape player 12 signals indicating that part of the test is terminated, which results in stopping the unreeling of the tape player. Once the general command to begin the test is given, the computer sends a signal which triggers a flip-flop (not shown) which, after amplification, triggers a power relay (not shown): this relay starts the tape player. The start command is preferably made by a person responsible for the test although it is possible to easily envisage an alternate way of starting the test where the subject himself provides the command. Two types of signals are received from the tape player. The first type is obtained by a conducting tape placed in series with a magnetic tape. The conducting tape serves to short-circuit a signal of predetermined voltage causing the tape player to stop and to indicate that part of the test is terminated. When the circuitry of FIG. 2 is used, a second signal is received for stopping the tape player after each word of the vocal test, as explained hereinbelow. The control unit must indicate to the computer that a word has been read and must immediately stop the tape player. When not all of the words are used during the vocal test, the tape is advanced until it is stopped by the metallic conductor on the tape which is placed at the end of the series of words of the test. At the end of the test, the tape is always returned to its start position.

With a system made in accordance with the present invention, it is possible to carry out a complete test which includes three main phases.

In the first phase, which is called the pre-test, a series of explanations concerning the test is given to the subject and a very short test is given him to ascertain whether or not he has understood the instructions received.

In the second phase, the subject may be given a vocal test which consists in transmitting a series of words pre-registered on the magnetic band of the tape player. For each word emitted, a group of words (for example six) are lit on a board 18 facing the subject in the cabin. The person being tested must press the button placed next to the word lit and heard. Depending on whether the response is correct or incorrect, the intensity of the word subsequently transmitted is given a higher or lower amplitude and a new group of words appear visible on the board. After a few words, the minimum threshold of hearing is reached and the amplitude varies around this level. This test is carried out for each ear.

In the third phase, the subject is given to hear pure tones at certain frequencies ranging between 125 Hz and 8,000 Hz and having intensity levels of decreasing values until the minimum threshold of hearing is reached for each tone frequency. Normally, the test is first carried out through aerial conduction and may be followed by a test through bone conduction. These tests are carried out for both ears. If there is a large difference between the minimum threshold of the two ears, the test is then made for the ear which is the weakest by providing a masking noise over the better ear. The results of all these tests are then printed out on a standard type form by the teletype associated with the computer.

The tape player 12 consists of an endless tape on which the instructions are pre-recorded. The different steps of execution of the test are clearly indicated on this tape. Furthermore, after each word transmitted during the vocal test, a signal serves to stop the tape player and to send a signal to the computer which then causes the lighting of the lamps on the board. The tape player is started by the computer after the subject has responded or after the maximum waiting period is terminated.

The function of the frequency control unit 18 consists in corresponding for each frequency value stored in the computer a signal which opens a gate selecting a frequency in the oscillator. Audiometric tests use up to eleven different frequencies. Standard frequencies are 125 Hz, 250 Hz, 500 Hz, 750 Hz, 1,000 Hz, 1,500 Hz, 2,000 Hz, 3,000 Hz, 4,000 Hz, 6,000 Hz and 8,000 Hz. Unit 18 may be constituted of eleven flip-flop circuits corresponding respectively to each frequency. The frequency command is transmitted from the computer 10 to the control unit 18 which memorizes by means of its flip-flop circuits the particular frequency. A word of eleven bits may be used in the computer to control the state of the flip-flops. For each command, only one of the eleven bits has the value 1 which corresponds to the particular frequency. Each bit controls a switch which selects a resistor input to the oscillator which determines the frequency.

An oscillator 20 is directly connected to the frequency control unit 18. The oscillator 20 is designed to be easily adapted to be controlled by computer and will convert the signal obtained from unit 18 into a specific frequency. Therefore, at the output of the oscillator, a signal of standard amplitude and of a particular frequency is obtained.

A relay 22 is connected to the oscillator 20 and serves to control the passage of the signal from the oscillator in accordance with the test period being used. In FIG. 2, relay 22 also serves to connect on the sound chain, either the signal from the oscillator, or that from the tape player.

The signal of desired frequency and of standard amplitude is fed to an attenuator (see 24 in FIG. 2) which forms part of an amplitude control unit 26. The range of necessary amplitude levels to make an acceptable audiogram is quite extensive, it extends over a 120 decibel range. Therefore, in order to obtain a signal which varies in as wide a range, two attenuators in cascade arrangement are used. A first attenuator will produce a gross attenuation, i.e., the signal will be attenuated by a factor $2^n$; a power of 2 is used in order to correspond to the binary signal of the computer. The fine attenuation is formed by a multiplying digital-to-analog converter having 12 bits at the input. Preferably, in order to avoid the presence of too weak tensions in the converter, it is preferable to place the fine attenuator upstream to the gross attenuator. The multiplying converter introduces in the signal a distortion of fixed amplitude. By introducing in the converter weak signals, there is a risk of introducing distortion which would greatly affect the signal with noise. On the other hand, the gross attenuator consisting only of resistances and relays, non-linear errors are avoided. The advantage of using a multiplying converter is to allow for easier calibration procedure; this attenuation correction may be made at the program level.

The amplitude control unit 26 also includes a power amplifier and noise filter unit 28 connected in series with the attenuator 24. The power amplifier is required since the impedance of the attenuator is too high to be connected directly to the earphones or to the vibrators. The filter is used to eliminate noise at the line frequency. This filter must have a quality factor sufficiently high since it is desired to attenuate the noise at 60 Hz without affecting the signal at 125 Hz. An example of such a filter is one consisting of an amplifier and of two rejection resistance-capacitance circuits. Such system enables a more selective rejection so that the signal at 125 Hz is not attenuated.

A timer 30 is connected between the interface 15 of the computer 10 and the relay 22. The timer is used to limit the duration of signal transmittal to the test subject and to measure the time waited before obtaining a response from the subject and the latency period between stimuli. The timer circuitry should include three parts: a pulse generator, a counter and a comparison circuit. The pulse generator furnishes pulses at predetermined intervals, for example 0.1 second. These pulses are transmitted to a counter. The timer is triggered by signals received from the computer. Some flip-flops being then at a value different than zero, the comparator energizes a gate which controls the signal from the pulse generator to the counter. The values received from the computer establish an initial value to the counter and, starting from the moment the signals are received from the computer, the latter starts to count down until all the flip-flops of the counter return to the value zero. With a counter having six flip-flops, a timer may be obtained which counts all the periods of 0.1 second to 6.3 seconds by increment of 0.1 second.

One feature of the present invention is that a noise generator 32 may be inserted in the system so that in cases where the subject hears better with one ear than with the other, the test is taken over for the weak ear by sending a masking noise in the better ear, this in order to avoid that the non-tested ear hears through simple bone conduction sounds which are aimed only at the tested ear. There are many known types of noise generators; however, a generator with a narrow band around the test frequency is generally preferred. The frequency control of noise generator 32 uses the same signal than that of the oscillator 20. Concerning the amplitude control, a signal obtained from the computer controls switches that determine the amplitude.

A multiplexer 36 under the command of the multiplexer control unit 37 insures proper interconnection between the audio signals received and the stimulus-applying means, i.e., earphones and vibrators. The multiplexer 36 enables the following combinations:

a. applying the tape player signal on both ears for the pre-test;
b. applying the tape player signal on either ear, the other ear being at rest;
c. applying the oscillator signal on one ear only with the other ear at rest;
d. applying the oscillator signal on one earphone, the other receiving a signal from the noise generator;
e. applying the oscillator signal on only one side of the vibrator, the other side being at rest;
f. applying the oscillator signal on one side of the vibrators, the other receiving a signal from the noise generator.

FIGS. 1 and 2 also schematically represent a test room 38 with earphones 40 and vibrators 40' and with a response indicating means 41, such as a "YES" botton to be used by the subject to indicate that he hears the particular audio signal transmitted to him through the earphones or vibrators. The response is transmitted directly to the computer. The absence of a response after a given time period is interpreted to mean that the subject has not heard.

Referring more particularly to FIG. 2, the test room 38 also includes a board 18 which is divided into a given number of plates 43 on which are inscribed a corresponding number of words. These words are not normally visible to the subject and may be hidden by a frost glass covering the plates. Each word or group of words becomes visible through lighting means appropriately positioned behind the inscribed words. Each plate includes response indicating means 45 to enable the subject to indicate that he has heard the word or one of the words which were lit during the vocal test. The board 18 further includes an additional plate 46 to indicate an "I DO NOT HEAR" answer: the subject then may indicate that he has not heard as he sees some words being lit on the board. The control of the board may be formed of flip-flop circuits which, on one hand, receive information from the computer and hold them in memory while the board is being commanded; on the other hand, the flip-flop circuit corresponding to the word elected by the subject is immediately returned to 0 which enables the response to be evaluated in the computer by comparing it to the excitation. A signal is also received in the computer indicating that a response has been given.

The system also includes some means 44 to indicate whether the test is in process or terminated, or whether the test is in the pre-test, vocal test or tonal test stage.

The operation of a basic audiometric test will now be described with the system made in accordance with the present invention. The subject is placed in the test room and the operator sees that the earphones (as well as the vibrators used for the bone conduction test) are well positioned on the subject. All data required for the subject file are previously typed. The test is started by a command of the teletype.

During the pre-test, the subject is given all information concerning the execution of the test and the manner in which a response should be given. Preferably, two short tests are conducted to eliminate subjects which for one reason or another would be unable to follow the test through. Hence, an advantage of the present invention is to eliminate the possibility of needlessly conducting a lenghty test period to those patients which are unable to receive the test; these patients are thereby not put in a condition which would render the subsequent test with an audiologist difficult to conduct. Another advantage is that the computer is used very shortly for those cases which cannot be carried out with the present system.

The computer gives the start command to the tape player, the magnetic band of which provides an explanation of the test as well as the instructions to the test subject. The sound chain is branched on the earphones. The instructions are then followed by two simple tests which are very short. In the first test, the subject is required to indicate on the board 18 those words which he has heard. Then, a number of words (say three) are read in a manner sufficiently loud so that most patients would be able to hear them: the attenuator is set at 70 db and sound is sent to both earphones for this test. As soon as a word is read, six words, for example, are made visible on the board and the subject must elect the word read. He then presses the corresponding button 45 and his answer is transmitted to the computer. If the subject's response is correct for the three words, a second pre-test is explained to him. Each time, the rectangle "DO YOU HEAR" is lit, he must indicate that a tone has been heard by him by pressing the "YES" button. For the test, the rectangle is lit three times; at the first and third times; a sound of 750 Hz at 70 db is transmitted to the earphones while the second time there is no sound transmitted. If the subject gives a wrong answer, one of the three tests is taken over. When the subject has correctly answered these three tests, it is indicated to him by a message on the tape that the proper test will begin. If the subject cannot respond correctly to these pre-tests, the test is stopped and the teletype indicates the same on the patient's file.

Having regard to the vocal test, a sequence of words are registered on the magnetic tape. After each word read, the band is stopped by a signal derived from a second track of the tape and the computer commands the lighting of certain number of lights on the board 18 as well as that of the plate marked "I DO NOT HEAR." At the same time, the timer 30 is triggered and begins the count of a predetermined period, say six seconds. The first word read is sent to the earphones with an amplitude of 50 db. If the subject presses the button of the corresponding plate, within the 6-second period, the computer commands an attenuation of 10 db and causes the tape player to advance to the following word and then to stop.

If the subject presses the button of a different plate than that of the word read or if he presses the button of "I DO NOT HEAR," or again if he does not respond within the six-second period, the computer triggers an increase of 10 db in the intensity level of the word and triggers the tape player for the reading of another word after previously closing those lights lit on the board.

This test is carried out for each ear separately. The notation 0 is used to indicate a wrong answer or the absence of a response and the notation 1 is used for a correct answer. If after a certain number of words read, a sequence 0101 is obtained, the test of the ear under study is stopped and the minimum threshold of hearing corresponds to the level of the last reading. Also, if a sequence of responses is noted 1010, the test is also stopped and the minimum threshold of the hearing is 10 db above the level of the last reading. If none of the above-mentioned sequences is obtained after all the words registered on the tape are read, the amplitude used for the last word is considered as the minimum threshold if the subject has given a correct answer. If the response to this last word is incorrect, the minimum threshold is 10 db above the amplitude at which the last word was read. It is to be noted that the number of words which appear on the board 18 after each reading of a word may easily be changed by simple modification of the computer program.

The subject is then informed of the tonal test by means of a message registered on the magnetic tape; he is informed that he must respond by pressing on the "YES" button when he hears a sound. Pure sounds having given frequencies and decreasing intensity levels are transmitted to the earphones. Generally, all tests are done on the right ear and are then transferred on the other ear unless the left ear is known to be in much better condition than the right one. The sequence of frequencies used are as follows: 1,000 Hz, 2,000 Hz, 4,000 Hz, 8,000 Hz, 1,000 Hz, 500 Hz, 250 Hz, and 125 Hz. The intensity level for the first test at 1,000 Hz is 30 db above the minimum threshold hearing obtained from the vocal test. For each correct answer, the signal is attenuated by steps of 10 db. As soon as no answer is given by the subject, the computer starts a series of trials to determine the minimum threshold of hearing with precision.

Pure sounds are transmitted for a given period, say about one second; then follows a waiting period of about two seconds. All responses within these three seconds are interpreted as correct answers. As soon as the subject responds or that the waiting period is terminated, there is a transition period or non-score period, which is the time before the next tone is transmitted. This transition period may last between one to six seconds; it varies to avoid establishing a rythm to which the subject could become accustomed to provide answers irrespective of his hearing a sound and which could be regarded as correct by the computer. A response in the transition period is not considered a correct answer, however it is noted. Three responses in the transition period for a test of a given frequency is indicated as an aberration: this eliminates the possibility that a subject goes through the test by frequently pressing the button even though he does not hear. For each correct answer, the amplitude of the tone which follows is decreased by 10 db. The test is continued for all correct answers until the subject no longer responds.

An example of the flexibility obtainable with a system according to the present invention will now be described. Let us assume that letters... C, B, A, T, S, R, ... represent a sequence of amplitude levels of decreasing increment of 10 db and that A is the first level at which no response has been obtained from the subject; a tone of amplitude $A^+$ of 5 db higher than A is sent to the subject, then amplitude A and again amplitude $A^+$. With the results of this test sequence A, $A^+$, A, $A^+$, one of the following alternatives may be taken:

a. the threshold limit is A or $A^+$;

b. to increase the amplitude and to repeat the test for B and $B^+$ (B being 10 db above A);

c. to lower the amplitude and continue the test for T;

d. to suspend the test with a view to return to it after a while: this is considered an aberration.

Conventionally, "1" will represent an affirmative hearing response and "0" will represent a negative hearing response; also, all possible combinations A, A⁺, A, A⁺ or B, B⁺, B, B⁺ are noted X, X⁺, X, X⁺. Furthermore, the results 0 1 and 1 0 for an amplitude are considered equivalent.

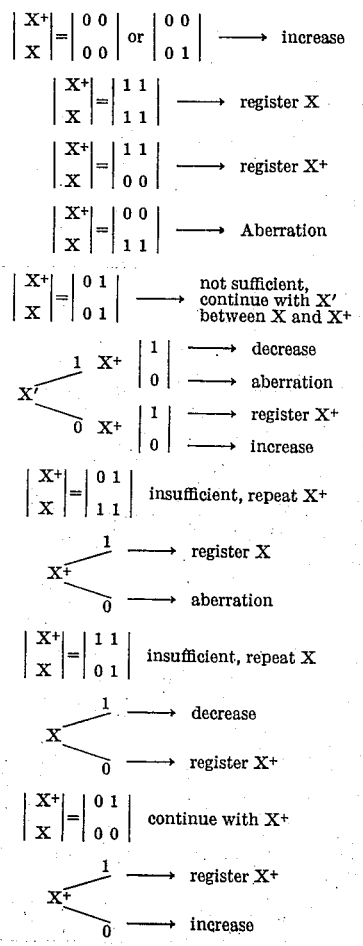

Before lowering the amplitude level, the result obtained is memorized and, if the tests at lower amplitude are negative, the threshold of hearing will be X. Furthermore, an increase from level A to level B, for example, is not followed by a decrease from B to A; the limit is therefore A⁺. If during the test more than two aberrations are encountered, the test is stopped and the apparatus indicates that the test cannot be continued. In the present procedure, two correct responses out of three are needed in order to establish that the subject does hear a sound at a given amplitude.

The above example of a test has been illustrated to show that, with the present invention, a decision may be reached without imposing lengthy tests. It is to be noted, however, that various algorithms may be used and any change may be easily effected since it only intervenes at the program level.

When the minimum threshold of hearing is determined for a frequency, the test is the same for all other frequencies of the test. For each frequency, an amplitude of 30 db above the minimum threshold for the previously determined frequency is used as a starting amplitude.

The test on one ear may be carried out or done over for certain frequencies in two cases. First, if the test for the minimum threshold seems to lead to answers which appear erratic, the test for this particular frequency is stopped and will later be carried out once the tests for all the standard frequencies will have been done. Secondly, if the threshold difference between two adjacent frequencies is over 30 db, a test is carried out for an intermediate frequency between these two frequencies. The intermediate frequencies are: 750 Hz, 1,500 Hz, 3,000 Hz and 6,000 Hz. All tests are trigerred automatically by the computer.

When both ears are tested, the computer may then start the Weber test with the vibrators. The sequence followed for this test is the same as that for the earphones. Once these tests are terminated, the computer evaluates the results obtained for both ears. If the difference between both ears is considerable, the hearing measurement of the weaker ear may be altered through bone conduction which transmits sounds from this weak ear to the other ear. The test for the weak ear is then done over by sending a masking noise in the better ear. This noise is on a frequency band around the test frequency used for the weak ear.

The criteria proposed for using masking noise are not well standardized in audiology. Certain criteria are therefore hereinafter proposed and they may be easily modified at the program level. In order to determine whether masking is necesary, the difference between the minimum threshold of hearing through bone conduction in the better ear and the minimum threshold of hearing by aerial conduction in the weaker ear is measured. If the difference between these two thresholds is 5 db or more, the test through bone conduction is done over for the weak ear by masking the better one. If the difference exceeds 40 db, the test by aerial conduction is done over again on the weak ear. The masking level depends on the minimum threshold by aerial conduction for the better ear. A signal is transmitted sufficient for masking this ear and the test is done over for the weak ear. If the threshold obtained is the same as that obtained without masking, the test is terminated. If the threshold has increased, the masking level is increased by 10 db. The test is continued until the hearing threshold remains stable.

Although the invention has been described above in relation to two specific forms of the invention, it will be evident to the man skilled in the art to modify and refine the invention in various ways. It is therefore wished to have it understood that the present invention is not limited in interpretation except by the terms of the following claims.

The embodiments of the invention in which an exclusive property or privilege is claimed are defined as follows:

1. An apparatus for automatically conducting a basic audiometric test on a subject comprising, in combination:
   a. a data processing means including a memory for storing data and instructions and having means for controlling the sequential execution of successively addressed instructions; said data stored representing a series of predetermined tone frequencies, amplitude levels and time periods; said instructions stored representing the execution of an audiometric test;
   b. translating means connected to said data processing means for generating for each frequency data stored in said data processing means a signal corresponding to said frequency data;

c. oscillator means connected to said translating means for converting each said signal received into a tone of standard amplitude;

d. attenuator means coupled to said oscillator means and to said data processing means for providing said tone with a plurality of amplitude levels in accordance with said amplitude level data stored in said data processing means;

e. timing means connected between said data processing means and said attenuator means for converting into time periods data received from said data processing means;

f. multiplexing means connected to said attenuator means for directing each tone to at least one ear of the subject; and g. response means connected to said data processing means for allowing the subject to indicate a response to each tone received from said multiplexing means; said data processing means including means for evaluating each response of the subject to each tone transmitted and for conducting one of the following instructions:

1. continue the test utilizing a different amplitude level for the same tone frequency;
2. register the minimum threshold of a tone frequency;
3. continue the test utilizing a different tone frequency; or
4. register an aberration.

2. An apparatus as defined in claim 1 further comprising tape player means connected between said data processing means and said multiplexing means for providing pre-recorded instructions to the subject concerning the test to be conducted.

3. An apparatus as defined in claim 2 wherein said tape player means include means for conducting a pre-test on the subject whereby said data processing means evaluates whether said subject is capable of receiving the test.

4. An apparatus as defined in claim 2 wherein said tape player means include means for conducting a vocal test whereby a series of a pre-recorded words on said tape player means are transmitted to the subject; said apparatus further including means for displaying to the subject a series of words whereby the subject indicates by said response means to said data processing means which word in said series of displayed words was heard.

5. An apparatus as defined in claim 4 wherein said displaying means include a board having thereon a series of word bearing plates and light means adjacent each said plate for displaying the word to the subject when lit.

6. An apparatus as defined in claim 1 further comprising noise generator means connected between said data processing means and said multiplexing means for generating noise to mask one ear of the subject.

7. An apparatus as defined in claim 6 wherein said noise generator means include a noise generator and a noise generator control unit, said noise generator being connected to said translating means whereby the noise extends over a narrow bandwidth around the test tone frequency.

8. An apparatus as defined in claim 2 further comprising switch means for alternately connecting said attenuator means to said oscillator means and to said tape player means.

9. An apparatus as defined in claim 1 further comprising amplification means and noise filtering means connected between said attenuator means and said multiplexing means.

10. An apparatus as defined in claim 1 further comprising means connected to said data processing means for indicating the state of the test being conducted.

11. An apparatus as defined in claim 1 further comprising means connected to said data processing means for reproducing the registered minimum threshold of a subject.

* * * * *